United States Patent
Bishnoi et al.

(10) Patent No.: US 7,603,498 B2
(45) Date of Patent: Oct. 13, 2009

(54) SYSTEM AND METHOD FOR MANAGING MULTIPLE INFORMATION HANDLING SYSTEMS USING EMBEDDED CONTROL LOGIC

(75) Inventors: Pankaj Bishnoi, Round Rock, TX (US); Brian R. Peil, Austin, TX (US); Jeremey Pionke, Royal Oak, MI (US)

(73) Assignee: Dell Products L.P., Round Rock, TX (US)

( * ) Notice: Subject to any disclaimer, the term of this patent is extended or adjusted under 35 U.S.C. 154(b) by 1384 days.

(21) Appl. No.: 10/804,443

(22) Filed: Mar. 19, 2004

(65) Prior Publication Data

US 2005/0219202 A1 Oct. 6, 2005

(51) Int. Cl.
*G09G 5/00* (2006.01)
*G06F 3/00* (2006.01)
*G06F 5/00* (2006.01)
*G06F 13/12* (2006.01)

(52) U.S. Cl. ............................. 710/62; 710/21; 710/38; 710/51; 345/1.1; 345/156

(58) Field of Classification Search ............... 710/1, 710/20, 21, 36, 38, 51, 62, 65, 72, 73; 345/1.1, 345/156
See application file for complete search history.

(56) References Cited

U.S. PATENT DOCUMENTS

| | | | |
|---|---|---|---|
| 6,378,009 B1 | 4/2002 | Pinkston, II et al. | 710/62 |
| 6,378,014 B1 | 4/2002 | Shirley | 710/100 |
| 6,408,334 B1 * | 6/2002 | Bassman et al. | 709/223 |
| 6,567,869 B2 | 5/2003 | Shirley | 710/62 |
| 6,671,756 B1 | 12/2003 | Thomas et al. | 710/73 |
| 7,003,563 B2 * | 2/2006 | Leigh et al. | 709/223 |
| 2003/0079055 A1 | 4/2003 | Chen | 710/1 |
| 2003/0082960 A1 | 5/2003 | Baker | 439/894 |
| 2003/0088655 A1 | 5/2003 | Leigh et al. | 709/223 |
| 2003/0131127 A1 * | 7/2003 | King et al. | 709/238 |

* cited by examiner

*Primary Examiner*—Niketa I Patel
*Assistant Examiner*—Richard Franklin
(74) *Attorney, Agent, or Firm*—Baker Botts L.L.P.

(57) ABSTRACT

A system and method for managing multiple information handling systems using embedded control logic are disclosed. An information handling system includes a first port for receiving first analog video signals and embedded control logic operably coupled to the first port. The embedded control logic selects either the first analog video signals received by the first port or second analog video signals generated by the information handling system. A second port operably coupled to the embedded control logic transmits at least one of the first and second analog video signals to a master controller operably coupled to the information handling system.

22 Claims, 3 Drawing Sheets

SYSTEM AND METHOD FOR MANAGING MULTIPLE INFORMATION HANDLING SYSTEMS USING EMBEDDED CONTROL LOGIC

TECHNICAL FIELD

The present disclosure relates in general to an information handling system, and more particularly to a system and method for managing multiple information handling systems using embedded control logic.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some applications, multiple information handling systems may be used simultaneously. For example, data centers may include multiple web servers, mail servers, general purpose servers, storage servers and similar devices mounted in vertical racks. These information handling systems may be managed by information technology (IT) personal in a many to one relationship such that a single IT person may manage the multiple information handling systems. Typically, the IT person uses a Keyboard, Video and Mouse (KVM) switch to connect multiple servers to a single mouse, keyboard and video monitor in a point-to-point topology.

The point-to-point topology, however, requires three (3) cables (e.g., one cable for each of the mouse, video and monitor functions) to connect each of the information handling systems to the KVM switch. In a rack including, for example, forty (40) servers, there may be as many as one-hundred twenty (120) cables used to connect the information handling systems to the KVM switch. Since many data centers include large numbers of information handling systems, cable management is quickly becoming a large problem. Additionally, most KVM switches may only support a maximum of eight (8) information handling systems. In a rack including more than eight (8) information handling systems, the appropriate number of additional KVM switches must be added to the data center. The KVM switches additionally may occupy one slot in the rack, thus reducing the number of information handling systems that may be included in the rack.

One solution to reducing the number of cables used to connect multiple information handling systems to a KVM switch is to use a master switch card coupled to multiple slave cards. The master switch card may be located in the first information handling system in the rack (e.g., the information handling system located in the top slot of the rack). The master card is then coupled to a slave card in the next information handling system in the rack by a single cable. The remaining information handling systems include slave cards that are connected by daisy chaining the systems together. In this solution, the master card is directly connected to a management system being used to monitor the data center. This direct connection is undesirable because the operation of the entire system is dependent upon the master card. If the master card fails or the information handling system containing the master card loses power, the management system cannot receive any information from any of the information handling systems in the rack.

In another solution, each information handling system may include a local management card that converts each of information handling system's signals into encoded and packetized signals carried over a cable. This solution eliminates the problem of relying on a master card to control the entire system but increases the cost of the system because complex circuitry is required to generate the packetized signals.

SUMMARY

In accordance with the present invention, the disadvantages and problems associated with managing multiple information handling systems have been substantially reduced or eliminated. In a particular embodiment, embedded control logic included in an information handling system selects first analog video signals received by a first port or second analog video signals generated by the information handling system for transmission to a master controller.

In accordance with one embodiment of the present invention, an information handling system includes a first port for receiving first analog video signals and embedded control logic operably coupled to the first port. The embedded control logic selects either the first analog video signals received by the first port or second analog video signals generated by the information handling system. A second port operably coupled to the embedded control logic transmits at least one of the first and second analog video signals to a master controller operably coupled to the information handling system.

In accordance with another embodiment of the present invention, an information handling system includes a first port for transmitting and receiving first video signals and a second port for transmitting and receiving second video signals. Embedded control logic is operably coupled between the first port and the second port. The embedded control logic selectively transmits to a master controller operably coupled to the information handling system either the first video signals received from the first port or third video signals generated by the information handling system through the second port or the second video signals received from the second port or the third video signals generated by the information handling system through the first port.

In accordance with a further embodiment of the present invention, a method for managing multiple information handling systems using embedded control logic includes receiving first analog video signals from a first port and generating second analog video signals by an information handling system. Either the first analog video signals received from the first port or the second analog video signals generated by the information are selected and transmitted through a second port to a master controller operable coupled to the information handling system.

Important technical advantages provided by certain embodiments of the present disclosure include embedded control logic that provides scalability for a data center including multiple information handling systems. The embedded control logic is located in each of the information handling systems and controls what video signals, keyboard signals and mouse signals are communicated to a keyboard, monitor and mouse connected to the data center. Because the logic controlling the video displayed on the monitor is located in each of the information handling systems, additional information handling systems may be easily added to the data center without the need to buy additional hardware to manage the added systems. Additionally, the embedded control logic does not limit the number of information handling systems that may be managed by a single monitor, keyboard and mouse.

Another important technical advantage provided by certain embodiments of the present disclosure includes embedded control logic that obtains operating information related to an information handling system. The embedded control logic includes a microcontroller in communication with the information handling system. Because the microcontroller is in direct communication with the information handling system, operating information such as an identification number, temperature of the information system, fan speed, internal voltage and the like may be communicated by the embedded control logic to be viewed by a system administrator at the monitor. Thus, the system administrator may determine if any hardware faults related to the operating information should be corrected.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
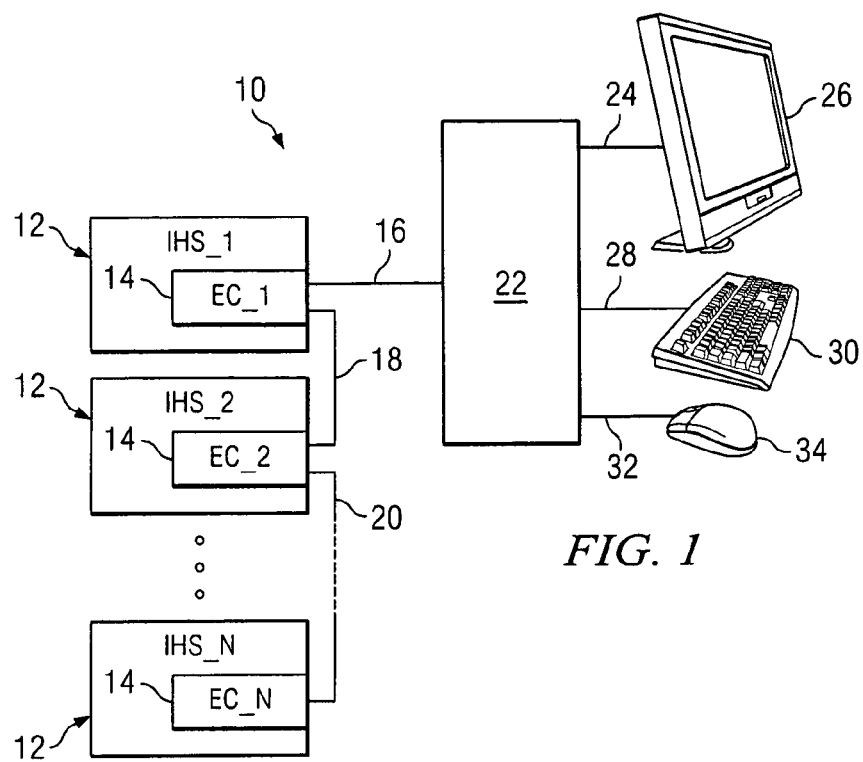
FIG. 1 illustrates a block diagram of a data center having multiple servers that include embedded control logic in accordance with teachings of the present invention.

Preferred embodiments and their advantages are best understood by reference to FIGS. 1 through 5, wherein like numbers are used to indicate like and corresponding parts.

In particular, the present disclosure concerns a system and method for managing multiple information handling systems using embedded control logic. In some applications, such as data centers, multiple information handling systems may be used as web servers, mail servers, general purpose servers and storage servers. The information handling systems may be mounted in vertical racks that are managed by a system administrator by using a single keyboard, monitor and mouse.

The information handling system provided by the present disclosure includes embedded control logic that selectively transmits either keyboard, video and mouse signals generated by the information handling system or keyboard, video and mouse signals received from another information handling system in the rack. In one embodiment, the keyboard and mouse signals may be digital signals communicated on a shared digital communication bus and the video signals may be analog signals.

The embedded control logic selects the appropriate signals to transmit based on a signal received from a master controller operably coupled to at least one of the information handling systems. In one embodiment, the embedded control logic may include a multiplexer and a processing resource, such as a microcontroller, that generates control signals for the multiplexer based on a signal received from the master controller. The processing resource may also obtain operating information, including but not limited to internal temperature, fan speed, operating voltage and an identification number, from the information handling system for communication to the master controller. In another embodiment, the embedded control logic may include at least two multiplexers such that the embedded control logic provides bi-directional communication of the keyboard, video and mouse signals.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, a server, or any other suitable device and may vary in size, shape, performance, functionality, and price. The information handling system may include random access memory (RAM), one or more processing resources such as a central processing unit (CPU) or hardware or software control logic, read only memory (ROM), and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, data center 10 including embedded control logic that provides internal switching management for multiple information handling systems is illustrated. For illustrative purposes, the information handling systems are described below as servers. In other embodiments, any type of information handling system may include embedded control logic for providing internal switching management in a data center.

In the illustrated embodiment, data center 10 includes servers 12 interfaced with monitor 26, keyboard 30 and mouse 34 through master controller 22. Servers 12, also labeled IHS_1 through IHS_n, represent a number n of servers which all may be mounted in a single rack. Cable 18 may connect IHS_1 to IHS_2 and cable 20 may connect IHS_2 to IHS_n such that servers 12 are daisy-chained together. Each of servers 12 may include embedded control (EC) logic 14 that functions to provide KVM switching intelligence in each of servers 12. In operation, EC 14 receives a selection signal from master controller 22 that selects the specific server to be monitored by a system administrator. Based on the selection signal, EC 14 transmits the keyboard, video and mouse signals (generally referred to as KVM signals) corresponding to the selected one of servers 12 to monitor 26 through master controller 22.

Monitor 26, keyboard 30 and mouse 34 may be used by a single IT person, such as a system administrator, to manage servers 12. In one embodiment, managing servers 12 may include viewing video from the selected server to perform various functions and execute various commands on the selected server. In another embodiment, managing servers 12 may also include obtaining operating information associated with the selected server to determine the health of the selected server.

Monitor 26 may be a liquid crystal device (LCD), cathode ray tube, or any other display device suitable for creating graphic images and alphanumeric characters recognizable to a user. Keyboard 30 may be any type of device used to input information into an information handling system, such as servers 12. Mouse 34 may be a roller mouse, optical mouse, wireless mouse or any other device that, when connected to a computer, allows a user to move a cursor around the display portion of monitor 26. Cable 16 may couple servers 12 to master controller 22, and cables 24, 28 and 32 may respectively couple monitor 26, keyboard 30 and mouse 34 to master controller 22. Cables 16, 18, 20, 24, 28 and 32 (generally referred to as cables 16) may be CAT5, CAT6 or any other suitable generic impedance control twisted pair cables that may be used to communicate analog and/or digital signals. In one embodiment, cables 16 may include six (6) twisted pairs. Cables 16 additionally may be interfaced with ports (not expressly shown) in each of servers 12.

Master controller 22 may include any circuitry that operates to generate signals for selecting one of servers 12 for monitoring by a system administrator and receive analog video signals for display on monitor 26. In one embodiment, master controller 22 may be circuitry included in a plastic mold that is located separate from a rack holding servers 12. In another embodiment, master controller 22 may be mounted in one slot of a rack including servers 12 and may have the capability to communicate through an Ethernet connection such that monitor 26, keyboard 30 and mouse 34 may be located remotely from data center 10.

In operation, EC 14 provides keyboard, video and mouse (KVM) switching intelligence in each of servers 12 and transmits the appropriate KVM signals to master controller 22 for display on monitor 26 when one of servers 12 is selected for monitoring by a system administrator. The system administrator typically uses monitor 26, keyboard 30 and mouse 34 to select one of servers 12 to manage. In one embodiment, a list of servers 12 in data center 10 may be displayed on monitor 26. The system administrator may use either or both of keyboard 30 and mouse 34 to select the server to manage. In another embodiment, the system administrator may use keyboard 30 and/or mouse 34 to enter an identification number for one of servers 12. In either embodiment, master controller 22 generates a selection signal indicating which one of servers 12 has been selected for monitoring. Master controller 22 then communicates the selection signal to each one of servers 12 through cables 16 on a shared communication bus.

EC 14 located in each of servers 12 may receive the selection signal from master controller 22 and use the selection signal to transmit the appropriate KVM signals from the selected one of servers 12. For example, the selection signal may indicate that the system administrator has selected IHS_2 for monitoring. Master controller 22 determines an identification number associated with the selected server and generates a selection signal to communicate to EC_1 through EC_n over cables 16.

Based on the selection signal, EC_1 may determine that any video signals received on an input port should be transmitted to IHS_2 through an output port. EC_1, therefore, bypasses the video signals generated internally by IHS_1. IHS_2 receives the video signals transmitted from IHS_1 through cable 18 on an input port. Since IHS_2 was selected for monitoring, EC_2 transmits the analog video signals generated internally by IHS_2 on an output port. These video signals are then communicated to IHS_n through cable 20. The video signals from IHS_2 are further communicated for display on monitor 26 through cable 18, cable 16 and master controller 22. In one embodiment, master controller 22 may include a video buffer that allows the video signals to be communicated through cable 24 to monitor 26. EC 14 may also use the selection signal to determine the keyboard and mouse signals to communicate on the shared digital bus.

In another embodiment, data center 10 may include multiple racks of servers 12. The multiple racks may be daisy chained together such that the video signals associated with any one of servers 12 may be displayed on monitor 26. For example, master controller 22 may be interfaced with a server located in the top slot of a first rack. The server may be connected to other servers located in lower slots of the first rack through daisy changed cables. A cable interfaced with a port of the server located in the bottom slot of the first rack may connect the servers in the first rack with a server located in the first slot of a second rack. The remaining servers in the second rack may then be daisy chained to the first server. Thus, a system administrator at monitor 26 may view video signals and use keyboard and mouse signals from any of the servers in either of the first or second racks. Since each of servers 12 may include embedded control logic, data center 10 may be scalable such that additional servers 12 may be added without the need to add any extra circuitry to monitor the servers.

Once master controller 22 receives the KVM signals, the system administrator may monitor the selected server (e.g., IHS_2 as described above). The analog video signals received from master controller 22 may be displayed on monitor 46 and the digital keyboard and mouse signals may be respectively used by keyboard 30 and mouse 34. The system administrator may then perform any management activity for IHS_2 by using monitor 26, keyboard 30 and mouse 34.

Figure 2:
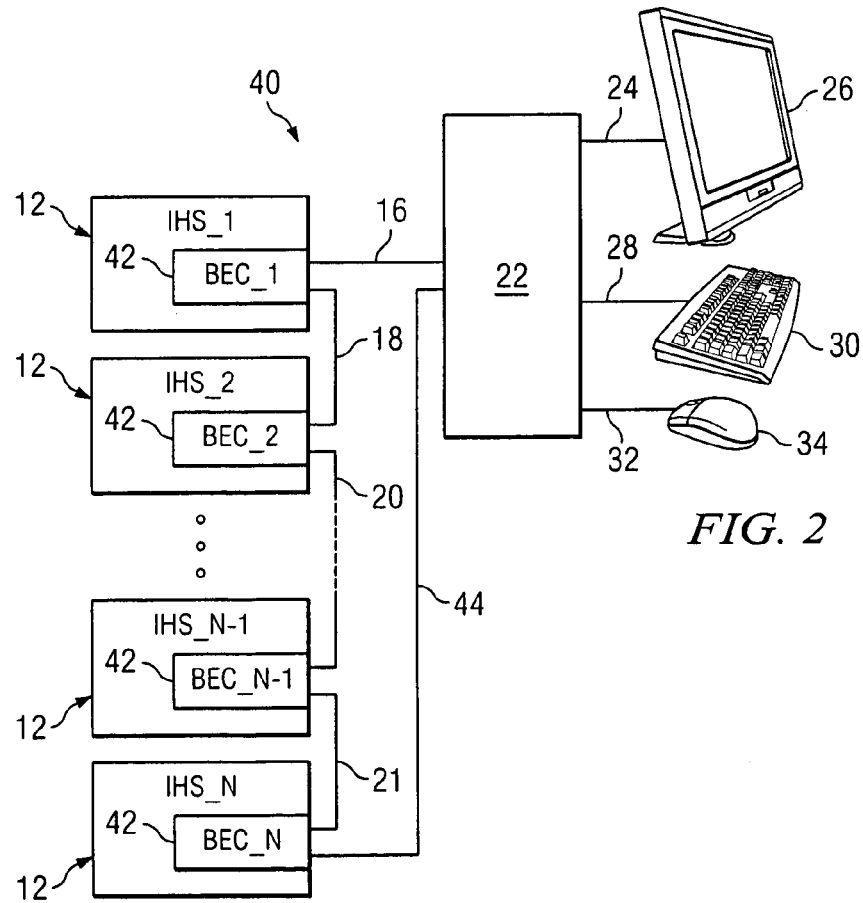
FIG. 2 illustrates a block diagram of a data center having multiple servers that include bi-directional embedded control logic in accordance with teachings of the present invention.

FIG. 2 illustrates a block diagram of another example embodiment of a data center that includes embedded control logic. Data center 40 includes servers 12 interfaced with monitor 26, keyboard 30 and mouse 34 through master controller 22. As described above in reference to FIG. 1, servers 12, also labeled IHS_1 through IHS_n, represent a number n of servers which all may be mounted in a single rack.

In the illustrated embodiment, cable 18 connects IHS_1 to IHS_2, cable 20 connects IHS_2 to IHS_n-1 and cable 21 connects IHS_n-1 to IHS_n. Additionally, master controller 22 is connected to IHS_1 by cable 16 and to IHS_n by cable 44 such that the KVM signals from servers 12 may be communicated to monitor 26 through multiple paths. The additional path closes the loop and may create a ring topology. The loop allows a single point of failure (e.g., one of cables 18, 20 and 21 is disconnected or one of servers 12 is inoperative) in data center 12 but still allows the KVM signals for a selected server to be communicated to monitor 26. In other embodiments, additional cables may be connected to different servers in data center 10 (e.g., another cable may directly connect master controller 22 to IHS_n-1) to create a combination ring and star topology. This allows for further redundancy in data center 10.

Each of servers 12 may include bi-directional embedded control logic (BEC) 42 that functions to provide KVM switching intelligence in each of servers 12. Similar to EC 14 as described above in reference to FIG. 1, BEC 42 transmits the appropriate analog video signals to monitor 26 through master controller 22 when one of servers 12 is selected for monitoring by a system administrator. When the system administrator selects a server to manage using monitor 26, keyboard 30 and/or mouse 34, master controller 22 generates a selection signal based on an identification number associated with the selected server and communicates the selection signal to servers 12 through cables 16, 18, 20, 21 and 44 on a shared communication bus.

Each of servers 12 may receive the selection signal from master controller 22 and use the selection signal to transmit the appropriate KVM signals from one of servers 12. For example, the selection signal may indicate that the system administrator has selected IHS_n-1 for monitoring. Master controller 22 transmits the selection signal over cables 16 and 44 to the respective the respective ports for IHS_1 and IHS_n interfaced with cables 16 and 44. Based on the control signal, BEC_1 determines that the analog video signals received on a first port should be transmitted to IHS_2 through a second port. The analog video signals generated internally by IHS_1, therefore, are bypassed. Additionally, BEC_n determines that the video signals received on a first port should be transmitted to IHS_n-1 through a second port and bypasses the video signals generated internally by IHS_n. IHS_2 receives the video signals from IHS_1 through cable 18 on a first port. Again, since IHS_2 was not selected for monitoring, BEC_2 bypasses the video signals generated internally by IHS_2 and transmits the video signals received from IHS_1 on the first port to IHS_n-1 via a second port.

IHS_n-1 receives the video signals from IHS_2 through cable 20 and the video signals from IHS_n through cable 21. Since the system administrator selected to manage IHS_n-1, BEC_n-1 communicates the analog video signals generated internally by IHS_n-1 over either or both of the ports associated with IHS_n-1. The internal video signals from IHS_n-1 may be communicated back to master controller 22 via one of two paths. First, the video signals may be communicated through cables 21 and 44. Second, the video signals may be communicated through cables 20, 18 and 16. The possibility of two different paths for the video signals to be communicated back to master controller 22 provides fault tolerance for data center 40. For example, the system administrator may remove cable 18 and/or IHS_2 may be disabled. In either case, the video signals cannot be communicated to master controller 22 through cable 16 since the path has been disconnected. The video signals, however, may still be communicated to master controller 22 through cable 44.

Once master controller 22 receives the video signals, a system administrator at monitor 26 may view the video associated with the selected server (IHS_n-1). The system administrator may then perform any management activity for IHS_n-1.

As described above in reference to FIG. 1, multiple racks including servers 12 may be connected such that the servers in all racks may be managed through monitor 26, keyboard 30 and mouse 34. The servers in each rack may include BEC 42 and one or more cables may be used to directly connect master controller 22 to one or more servers in the multiple racks. As described above, the multiple connections between master controller 22 and servers 12 in the multiple racks may provide fault tolerance in data center 40. The multiple connections to master controller 22 may additionally allow more than one server to be monitored at one time by the system administrator.

Figure 3:
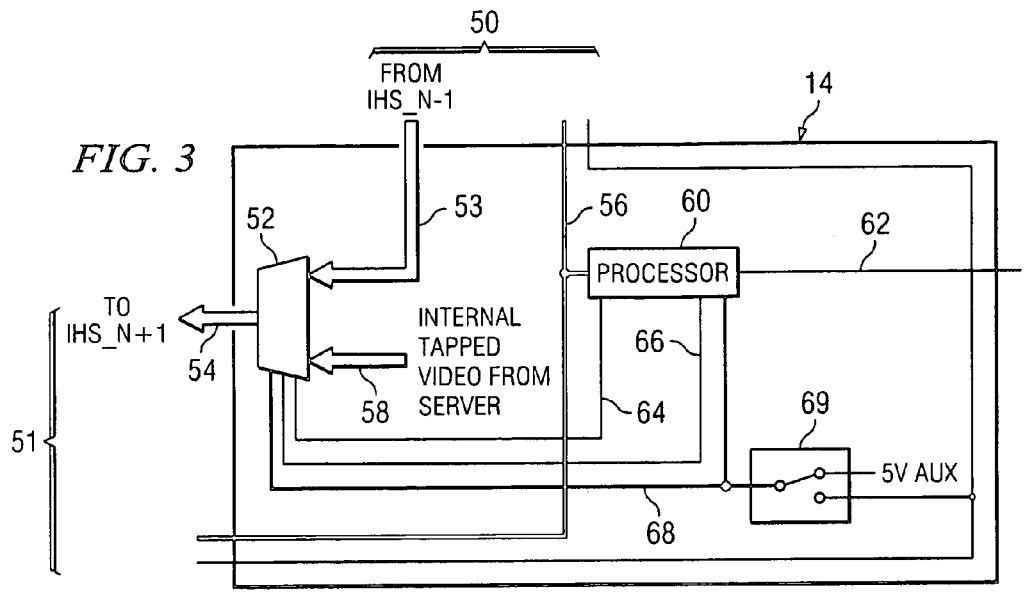
FIG. 3 illustrates a circuit diagram of embedded control logic included in a server in accordance with teachings of the present invention.

FIG. 3 illustrates a circuit diagram of embedded control logic that provides internal KVM switching management for multiple servers. EC 14 includes ports 50 and 51, mux 52 and processor 60. Cables, as described above in reference to FIG. 1, may interface with ports 50 and 51. In one embodiment, the cables may include six twisted pairs. Video signals 53 may be transmitted on four of the six twisted pairs of the cable interfaced with port 50 and video signals 54 may be transmitted on four of the six twisted pairs of the cable interfaced with port 51. Shared bus 56 may be transmitted over the remaining two pairs in the cables interfaced with ports 50 and 51. As shown, shared bus 56 may provide a direct path between ports 50 and 51. Shared bus 56 may be a RS485 bus, a CAN bus or any other multidrop digital communication bus that allows transmission of digital signals between processor 60 and master controller 22. Shared bus 56 may communicate signals including, but not limited to, keyboard and mouse signals and various communication signals between master controller 22 and servers 12. In other embodiments, the cables may include any number of twisted pairs such that the video signals and shared bus 56 may be communicated simultaneously.

Mux 52 may be any analog mux having buffered inputs and outputs. In other embodiments, mux 52 may be any mux that transmits analog video signals generated internally by servers 12 such that no analog to digital conversion is necessary. In the illustrated embodiment, mux 52 may be a two-to-one mux having two inputs for receiving video signals 53 from port 50 and video signals 58 generated by servers 12 and one output for transmitting video signals 54 to port 51. In one embodiment, video signals 53, 54 and 58 may be RGB signals including a sync signal. In other embodiments, video signals 53, 54 and 58 may be any type of analog video signals generated by servers 12 that may be displayed on monitor 26.

Processor 60 may be a microprocessor, a microcontroller, a digital signal processor (DSP) or any other digital circuitry configured to process digital signals received from shared bus 56 and internal bus 62. Processor 60 may be interfaced with shared bus 56, internal bus 62 and mux 52. Internal bus 62 may be an I²C bus or any other bus configured to communicate signals between processor 60 and other components in servers 12.

As described above in reference to FIG. 1, EC 14 may be included in each of servers 12. A system administrator using monitor 26, keyboard 30 and mouse 34 may select one of servers 12 to manage. Master controller 22 may generate a selection signal based on an identification number associated with the selected server and communicate the selection signal over shared bus 56. Processor 60 may receive the selection signal from shared bus 56 through port 50 or 51 and generate mux signal 64 and disable signal 66 based on the selection signal.

If processor 60 determines that the server containing EC 14 was selected to be managed, processor 60 generates mux signal 64 such that video signals 58 generated by the selected server are transmitted to the output of mux 52. If processor 60 determines that the server containing EC 14 was not selected, processor generates disable signal 66 such that video signals 53 received from port 50 are transmitted to the output of mux 52. Therefore, either video signals 53 or video signals 58 may be transmitted as video signals 54 on port 51 such that the appropriate video signals may be communicated for viewing on monitor 26.

In some embodiments, processor 60 may query other components of servers 12 to determine operating information associated with servers 12. For example, the operating information may include, but is not limited to, the internal operating temperature of servers 12, operating speed of any fans in servers 12 and the core voltage level of servers 12. Processor 60 may communicate the operating information to master controller 22 over shared bus 56. Processor 60 may additionally receive low bandwidth control information over shared bus 56 from keyboard 30 and mouse 34 and translate the information into the appropriate keyboard and mouse commands to execute various commands in servers 12.

EC 14 may additionally include backup power signal 68 generated by backup power source 67. Backup power signal 68 may provide a power source for processor 60 and mux 52 when the server including EC is powered down. Backup power signal 68, therefore, may allow a system administrator to monitor video from the powered down server. Additionally, backup power signal 68 may prevent the communication path for the video signals from being broken if one of servers 12 is powered down. In one embodiment, AC power connected to the server may be disconnected. Backup power source 67 may generate backup power signal 68 using the backup power provided through the cables interfaced with ports 50 and 51.

Figure 4:
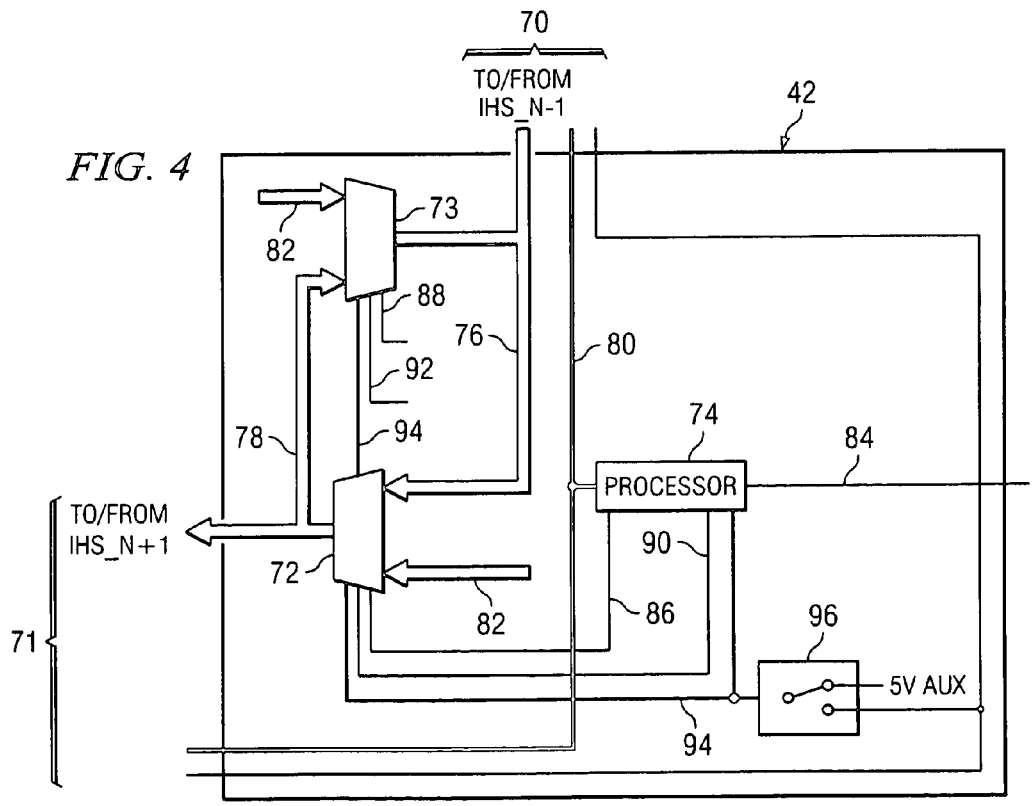
FIG. 4 illustrates a circuit diagram of bi-directional embedded control logic included in a server in accordance with teachings of the present invention.

FIG. 4 illustrates a circuit diagram of bi-directional embedded control logic that provides internal KVM switching management for multiple servers. BEC 42 includes ports 70 and 71, muxes 72 and 73 and processor 74. Cables, as described above in reference to FIG. 1, may interface with ports 70 and 71. In one embodiment, the cables may include six twisted pairs. Video signals 76 may be transmitted on four of the six twisted pairs of the cable interfaced with port 70 and video signals 78 may be transmitted on four of the six twisted pairs of the cable interfaced with port 71. Shared bus 80 may be transmitted over the remaining two pairs in the cables interfaced with ports 70 and 71. As shown, shared bus 56 may provide a direct path between ports 70 and 71. Shared bus 80 may be a RS485 bus, a CAN bus or any other multidrop digital communication bus that allows transmission of digital signals. Shared bus 80 may communicate signals including, but not limited to, keyboard and mouse signals and various communication signals between master controller 22 and servers 12. In other embodiments, the cables may include any number of twisted pairs such that the video signals and shared bus 80 may be communicated simultaneously.

Muxes 72 and 73 may be any analog mux having buffered inputs and outputs. In other embodiments, muxes 72 and 73 may be any mux that transmits analog video signals generated internally by servers 12 such that no analog to digital conversion is necessary. In the illustrated embodiment, muxes 72 and 73 may be a two-to-one muxes having two inputs for receiving video signals 76 from port 70, video signals 78 from port 71 and video signals 82 internally generated by servers 12 and an output for transmitting video signals 76 to port 70 and video signals 78 to port 71. In one embodiment, video signals 76, 78 and 82 may be RGB signals including a sync signal. In other embodiments, video signals 76, 78 and 82 may be any type of analog video signals generated by servers 12 that may be displayed on monitor 26.

Processor 74 may be a microprocessor, a microcontroller, a digital signal processor (DSP) or any other digital circuitry configured to process digital signals received from shared bus 80 and internal bus 84. Processor 74 may be interfaced with shared bus 80, internal bus 84 and muxes 72 and 73. Internal bus 84 may be an $I^2C$ bus or any other bus configured to communicate signals between processor 74 and other components in servers 12.

As described above in reference to FIG. 2, BEC 42 may be included in each of servers 12. A system administrator using monitor 26, keyboard 30 and mouse 34 may select one of servers 12 to manage. Master controller 22 may generate a selection signal based on an identification number associated with the selected server and communicate the selection signal over shared bus 80. Processor 74 may receive the selection signal from shared bus 56 through port 70 or 71 and generate mux signals 86 and 88 and disable signals 90 and 92 based on the selection signal.

If processor 74 determines that the server containing BEC 42 was selected to be managed, processor 74 generates either or both of mux signals 86 and 88 such that video signals 82 generated by the selected server are transmitted to the outputs of mux 72 and 73. If processor 74 determines that the server containing BEC 42 was not selected, processor generates either or both of disable signals 90 and 92 such that video signals 76 received from port 70 are transmitted to the output of mux 72 and/or video signals 78 received from port 71 are transmitted to the output of mux 73. Therefore, either video signals 76 or video signals 82 may be transmitted as video signals 78 on port 71 and/or either video signals 78 or video signals 82 may be transmitted as video signals 76 on port 70 such that the appropriate video signals may be communicated for viewing on monitor 26.

In one embodiment, processor 74 may generate mux signals 86 and 88 such that video signals 82 generated by the selected server are transmitted to the output of mux 72 and video signals 78 received on port 71 are transmitted to the output of mux 73. BEC 42, therefore, may allow the video from more than one of servers 12 to be displayed on monitor 26.

Similar to processor 60 in EC 14 illustrated in FIG. 3, processor 74 also may query other components of servers 12 to determine operating information associated with servers 12. For example, the operating information may include, but is not limited to, the internal operating temperature of servers 12, operating speed of any fans in servers 12 and the core voltage level of servers 12. Processor 74 may communicate the operating information to master controller 22 over shared bus 80. Processor 74 may additionally receive low bandwidth control information over shared bus 80 from keyboard 30 and mouse 34 and translate the information into the appropriate keyboard and mouse commands to execute various commands in servers 12.

BEC 42 may additionally include backup power signal 94 generated by backup power source 96. Backup power signal 94 may provide a power source for processor 74 and muxes 72 and 73 when the server including BEC is powered down. Backup power signal 94, therefore, may allow a system administrator to monitor video from the powered down server. Additionally, backup power signal 94 may prevent the communication path for the video signals from being broken if one of servers 12 is powered down. In one embodiment, AC power connected to the server may be disconnected. Backup power source 96 may generate backup power signal 94 using the backup power provided through the cables interfaced with ports 70 and 71.

Figure 5:
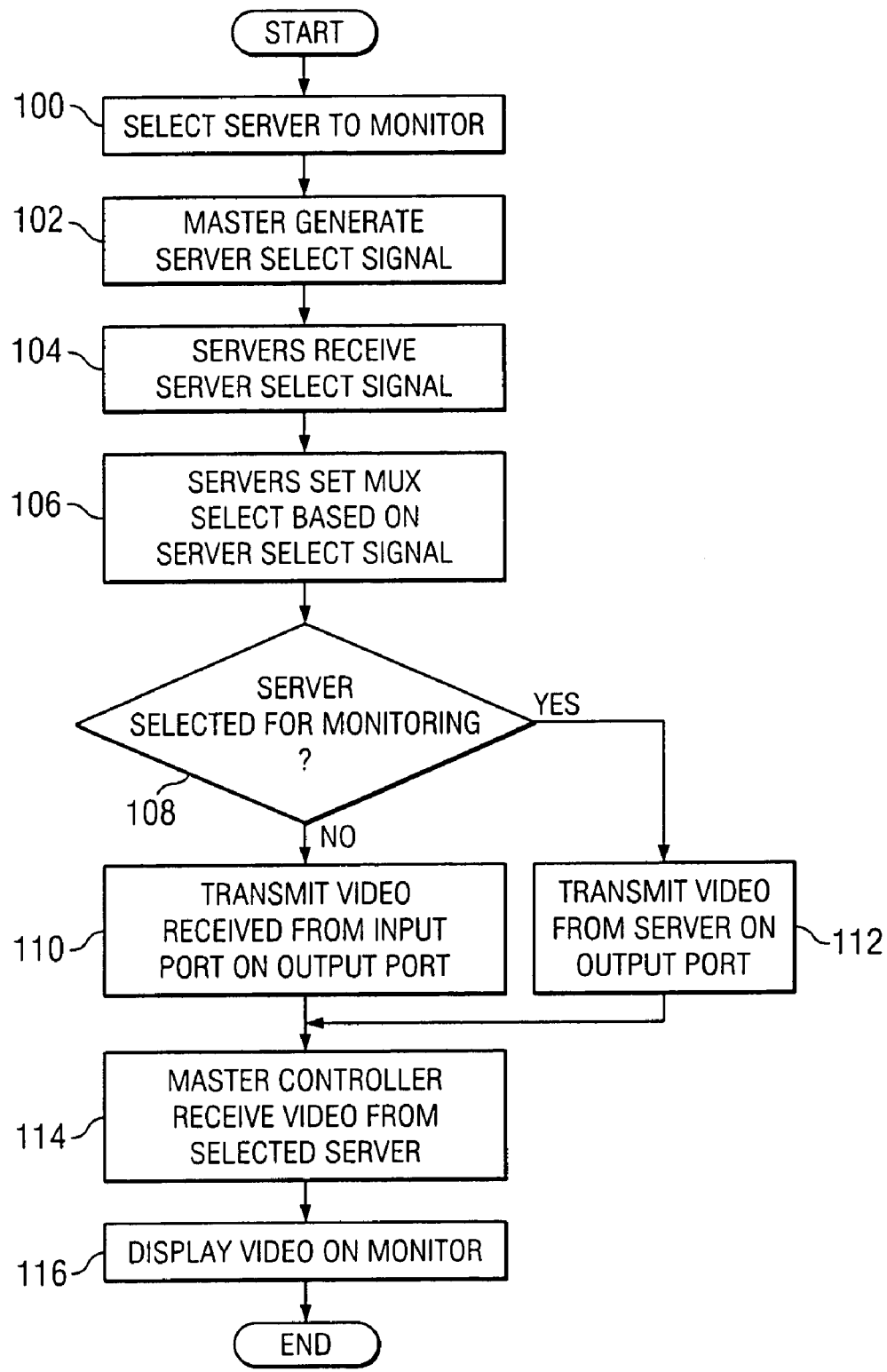
FIG. 5 illustrates a flow chart of a method for managing multiple information handling systems using embedded control logic in accordance with teachings of the present invention.

FIG. 5 illustrates a flow chart of a method for managing multiple information handling systems using embedded control logic. Generally, a data center may include multiple servers that may be managed through a single set of peripherals in a one-to-many relationship. The servers may include embedded control logic that provides KVM switching capability for each server. The embedded control logic uses a selection signal from a master controller to determine what KVM signals should be communicated to the peripherals. If the embedded control logic determines that the server has been selected, the embedded control logic transmits the analog video signals generated internally by the selected server to the master controller. Otherwise, the embedded control logic transmits video signals received from another server in the data center.

At step 100, a system administrator using monitor 26, keyboard 30 and mouse 34 selects a server to monitor. In one embodiment, a list of servers 12 may be displayed on monitor 26 and the desired server may be selected by using keyboard 30 and/or mouse 34. In another embodiment, the system administrator may enter an identification number or address associated with the desired server using keyboard 30. In a further embodiment, a server may be selected from a pull down menu using keyboard 30 and/or mouse 34.

The identification number and/or address associated with the selected server is communicated to master controller 22 at step 102. Master controller 22 generates a selection signal using the identification number and/or address. Master controller 22 then communicates the selection signal to embedded control logic in servers 12 through the cables connecting master controller 22 to servers 12. At step 104, servers 12 receive the selection signal. As described above in reference to FIGS. 3 and 4, the selection signal may be received by a processor in the embedded control logic located each of servers 12 from a shared bus. The processor in the embedded control logic uses the selection signal to generate a mux signal at step 106. The mux signal enables a mux included in the embedded control logic, which selects the appropriate video signals to communicate to monitor 26.

At step 108, servers 12 including the embedded control logic determine the server selected for monitoring by a system administrator. If the server was not selected for monitoring, the processor generates a disable signal that enables transmission of the video signals received from another server in the data center at step 110. If the server was selected for monitoring, the processor generates a mux signal that enables transmission of the video signals generated internally by the selected server at step 112.

At step 114, master controller 22 receives the video signals and keyboard and mouse signals over the shared bus from the selected server. The video signals are communicated to monitor 26 such that a system administrator may view video from the selected server at step 116. The system administrator may, therefore, view the video generated by the selected server.

Although the disclosed embodiments have been described in detail, it should be understood that various changes, substitutions and alterations can be made to the embodiments without departing from their spirit and scope.

What is claimed is:

1. An information handling system, comprising:
a first port operable to receive first analog video signals;
embedded control logic operably coupled to the first port, the embedded control logic operable to select either the first analog video signals received by the first port or second analog video signals generated by the information handling system;
a second port operably coupled to the embedded control logic, the second port operable to transmit at least one of the first and second analog video signals to a master controller operably coupled to the information handling system and operable to receive third analog video signals;
the first port further operable to transmit the second and third analog video signals; and
the embedded control logic further operable to selectively transmit either the first analog video signals received by the first port and the second analog video signals generated by the information handling system over the second port or the third analog video signals received by the second port and the second analog video signals generated by the information handling system over the first port.

2. The system of claim 1, wherein the embedded control logic comprises:
a multiplexer including:
a first input interfaced with the first port;
a second input interfaced with a video source in the information handling system; and
an output interfaced with the second port;
the multiplexer operable to transmit the first analog video signals received by the first port and the second analog video signals generated by the information handling system to the second port; and
a processing resource interfaced with the multiplexer and the first and second ports, the processing resource operable to generate a mux signal for selecting the first and second analog video signals.

3. The system of claim 2, further comprising the mux signal generated based on a selection signal received from a shared bus through at least one of the first and second ports on a shared bus, the selection signal generated by the master controller.

4. The system of claim 1, further comprising the embedded control logic operable to obtain operating information associated with the information handling system.

5. The system of claim 4, further comprising the operating information selected from the group consisting of temperature, operating voltage, and fan speed.

6. The system of claim 1, wherein the embedded control logic includes a backup power source operable to power the embedded control logic if the information handling system is powered off.

7. The system of claim 1, further comprising the first and second ports operable to receive backup power for operating the embedded control logic if an AC power source for the information handling system is disconnected.

8. The system of claim 1, further comprising:
a first twisted pair cable operably coupled to the first port; and
a second twisted pair cable operably coupled to the second port;
the first and second twisted pair cables operable to transmit the first and second analog video signals.

9. The system of claim 1, wherein the first and second analog video signals comprise RGB signals.

10. The system of claim 1, wherein the master controller receives the first and second analog signals and converts the first and second analog video signals to digital video signals for transmission over an Ethernet.

11. An information handling system, comprising:
a first port operable to transmit and receive first video signals;
a second port operable to transmit and receive second video signals; and
embedded control logic operably coupled between the first port and the second port, the embedded control logic operable to selectively transmit to a master controller operably coupled to the information handling system either the first video signals received from the first port or third video signals generated by the information handling system through the second port or the second video signals received from the second port or the third video signals generated by the information handling system through the first port.

12. The system of claim 11, wherein the embedded control logic comprises:
a first multiplexer including:
a first input interfaced with the first port;
a second input interfaced with a video source in the information handling system; and
an output interfaced with the second port;
the first multiplexer operable to select either the first video signals received by the first port or the third video signals generated by the information handling system for transmission through the second port;
a second multiplexer including:
a first input interfaced with the second port;
a second input interfaced with the video source in the information handling system; and
an output interfaced with the first port;
the second multiplexer operable to select either the second video signals received by the second port or the third video signals generated by the information handling system for transmission through the first port; and
a processing resource interfaced with the first and second multiplexers and between the first and second ports, the processing resource operable to generate mux signals for selecting the first, second and third video signals.

13. The system of claim 11, further comprising the embedded control logic operable to obtain operating information for the information handling system.

14. The system of claim 13, further comprising the operating information selected from the group consisting of temperature, operating voltage, operating speed and fan speed.

15. The system of claim 11, wherein the first, second and third video signals comprise analog video signals.

16. The system of claim 11, wherein the embedded control logic includes a backup power source operable to power the embedded control logic if the information handling system is powered off.

17. The system of claim 11, further comprising the first port and second ports operable to receive backup power for operating the embedded control logic if an AC power source for the information handling system is disconnected.

18. A method managing multiple information handling systems using embedded control logic, comprising:
receiving first analog video signals from a first port;
generating second analog video signals by an information handling system;
selecting either the first analog video signals received from the first port or the second analog video signals generated by the information handling system based on a selection signal received from a master controller operably coupled to the information handling system;
transmitting the selected analog video signals through a second port to the master controller;
receiving third analog video signals from the second port;
selecting the first analog video signals received from the first port or the second analog video signals generated by the information handling system for transmission over the second port;
selecting the third analog video signals received from the second port or the second analog video signals generated by the information handling system for transmission over the first port; and
transmitting the selected analog video signals through at least one of the first and second ports.

19. The method of claim 18, further comprising:
obtaining operating information associated with the information handling system; and
transmitting system information through the second port to the master controller.

20. The method of claim 18, further comprising generating backup power through a backup power source in the information handling system if the information handling system is powered off.

21. The method of claim 18, further comprising the selection signal received from at least one of the first and second ports on a shared bus.

22. The method of claim 18, further comprising at least one of a keyboard signal and a mouse signal received from at least one of the first and second ports on a shared bus.

* * * * *

UNITED STATES PATENT AND TRADEMARK OFFICE
CERTIFICATE OF CORRECTION

| | |
|---|---|
| PATENT NO. | : 7,603,498 B2 |
| APPLICATION NO. | : 10/804443 |
| DATED | : October 13, 2009 |
| INVENTOR(S) | : Bishnoi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1608 days.

Signed and Sealed this

Fifth Day of October, 2010

David J. Kappos
*Director of the United States Patent and Trademark Office*